(12) United States Patent
Jeon et al.

(10) Patent No.: US 9,150,416 B2
(45) Date of Patent: Oct. 6, 2015

(54) METHOD OF FORMING HIGH-QUALITY HEXAGONAL BORON NITRIDE NANOSHEET USING MULTI COMPONENT EUTECTIC POINT SYSTEM

(75) Inventors: Seok-Woo Jeon, Daejeon (KR); Soon-Hyung Hong, Daejoen (KR); Dong-Ju Lee, Daejeon (KR); Kwang-Hyun Park, Jeollanam-Do (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 13/976,339

(22) PCT Filed: Jan. 9, 2012

(86) PCT No.: PCT/KR2012/000209
§ 371 (c)(1),
(2), (4) Date: Jun. 26, 2013

(87) PCT Pub. No.: WO2012/115348
PCT Pub. Date: Aug. 30, 2012

(65) Prior Publication Data
US 2013/0323150 A1 Dec. 5, 2013

(30) Foreign Application Priority Data
Feb. 23, 2011 (KR) .......................... 10-2011-0016037

(51) Int. Cl.
*C01B 21/064* (2006.01)
(52) U.S. Cl.
CPC ......... *C01B 21/0648* (2013.01); *C01P 2002/82* (2013.01); *C01P 2002/88* (2013.01); *C01P 2004/04* (2013.01); *C01P 2004/24* (2013.01)
(58) Field of Classification Search
None
See application file for complete search history.

(56) References Cited

U.S. PATENT DOCUMENTS

| | | |
|---|---|---|
| 4,045,186 A | 8/1977 | Corrigan |
| 4,562,050 A | 12/1985 | Koeda et al. |
| 5,028,650 A | 7/1991 | Enloe et al. |
| 2002/0076557 A1 | 6/2002 | Fauzi et al. |
| 2011/0045223 A1* | 2/2011 | Lin et al. ................ 428/36.9 |

OTHER PUBLICATIONS

Qian et al.; Exfoliation of Hexagonal Boron Nitride by Molten Hydroxides; Adv. Mater.; 25, pp. 2200-2204; Feb. 2013.*
Zettl et al.; Longitudinal Splitting of Boron Nitride Nanotubes for the Facile Synthesis of High Quality Boron Nitride Nanoribbons; Nano Lett.; 11, pp. 3221-3226; May 4, 2011.*

* cited by examiner

*Primary Examiner* — Guinever S Gregorio
(74) *Attorney, Agent, or Firm* — William Park & Associates Ltd.

(57) ABSTRACT

Provided is a method of manufacturing a hexagonal boron nitride nanosheet to mass-produce a high-quality hexagonal boron nitride nanosheet at a low temperature in a safe process. The method of manufacturing a hexagonal boron nitride nanosheet includes (a) obtaining an alkali metal ion or alkali earth metal ion from a salt mixture including at least two kinds of alkali metal salt or alkali earth metal salt, (b) preparing a hexagonal boron nitride interlayer compound by inserting the alkali metal ion or alkali earth metal ion into layers of hexagonal boron nitride, and (c) obtaining a hexagonal boron nitride nanosheet by removing the alkali metal ion or alkali earth metal ion from the hexagonal boron nitride interlayer compound.

6 Claims, 7 Drawing Sheets

BORON NITRIDE     INTERLAYER COMPOUND     NANOSHEET

METHOD OF FORMING HIGH-QUALITY HEXAGONAL BORON NITRIDE NANOSHEET USING MULTI COMPONENT EUTECTIC POINT SYSTEM

TECHNICAL FIELD

The present invention relates to a method of manufacturing a hexagonal boron nitride nanosheet, and more particularly, to a method of preparing a boron nitride interlayer compound and manufacturing a single- or multi-layered boron nitride nanosheet using the same.

BACKGROUND ART

Boron nitride has a BN formula, in which a boron atom and a nitrogen atom form a two dimensional hexagonal structure. Since this structure is a similar hexagonal-based structure to that of graphite, boron nitride has similar chemical and physical properties to graphite, and thus is a material having highly physical and chemical stabilities. In an inactive atmosphere, boron nitride is stable at up to 3000° C., has thermal conductivity as high as that of stainless steel, thereby having a high thermal shock resistance, and is not cracked or damaged even if it is repeatedly subjected to rapid heating at approximately 1500° C. or rapid cooling. In addition, boron nitride has very excellent high temperature lubricating property and corrosion resistance. In addition, since boron nitride has a significantly high electric resistance value and less change in the electric resistance value, particularly at a high temperature, it may be used as an electric insulating material in a wide temperature range, and emits UV rays when an electric field is applied. Moreover, boron nitride is transparent and has excellent flexibility due to space margin of a hexagonal honeycomb structure in which boron atoms and nitrogen atoms are linked in the form of a network. Specific structure and physical properties of such boron nitride may be applied to an insulator of a semiconductor material and a UV radiator.

Recently, as demands and concerns on nanotechnology are increased, research to obtain boron nitride in a type of a nanosheet or nanotube is progressing. Currently, as a method of manufacturing a hexagonal boron nitride nanosheet, mechanical peeling, chemical vapor deposition (CVD), or a boron nitride interlayer compound method is used, and generally, the CVD and mechanical peeling are used for manufacturing a hexagonal boron nitride nanosheet.

The mechanical method is a method of detaching a single-layered or multi-layered boron nitride of a hexagonal boron nitride in a solvent through ultrasonic wave treatment. According to this method, it is simple to manufacture but difficult to mass-produce a hexagonal boron nitride nanosheet. The CVD method is a method of forming a thin metal film by depositing a catalyst metal on a substrate and cooling the film after a gas including boron and nitrogen flows at a high temperature of 1000° C. or more, thereby obtaining a boron nitride nanosheet formed on the metal film. According to this method, a process temperature is very high, and thus it is difficult to obtain a larger and less expensive boron nitride nanosheet.

DISCLOSURE

Technical Problem

The present invention is directed to providing a method of manufacturing a hexagonal boron nitride nanosheet at a low temperature by a safe process to mass-produce a high-quality hexagonal boron nitride nanosheet.

Technical Solution

One aspect of the present invention provides a method of manufacturing a hexagonal boron nitride nanosheet, including (a) obtaining an alkali metal ion or alkali earth metal ion from a salt mixture including at least two kinds of alkali metal salts or alkali earth metal salts, (b) preparing a hexagonal boron nitride interlayer compound by inserting the alkali metal ion or alkali earth metal ion between layers of hexagonal boron nitride, and (c) obtaining a hexagonal boron nitride nanosheet by removing the alkali metal ion or alkali earth metal ion from the hexagonal boron nitride interlayer compound.

Advantageous Effects

The present invention uses an inexpensive and safe salt, not directly using a metal to prepare a hexagonal boron nitride interlayer compound. Accordingly, a hexagonal boron nitride nanosheet can be produced by an inexpensive, simple, and safe process. The present invention also uses a salt mixture having a low eutectic point, and thus a process of manufacturing a hexagonal boron nitride nanosheet may progress at a low temperature. Particularly, when a salt mixture is formed by selecting a suitable salt and a suitable composition ratio, a hexagonal boron nitride nanosheet may also be manufactured at a low temperature of 500° C. or less.

In the present invention, compared with other processes of manufacturing a hexagonal boron nitride nanosheet, a process of manufacturing a hexagonal boron nitride nanosheet may be performed at a low temperature and is simple, and thus a high-quality hexagonal boron nitride nanosheet may be mass-produced. Accordingly, applicability of a hexagonal boron nitride nanosheet to an insulator and a UV radiator may be suggested.

MODES FOR INVENTION

Figure 1:
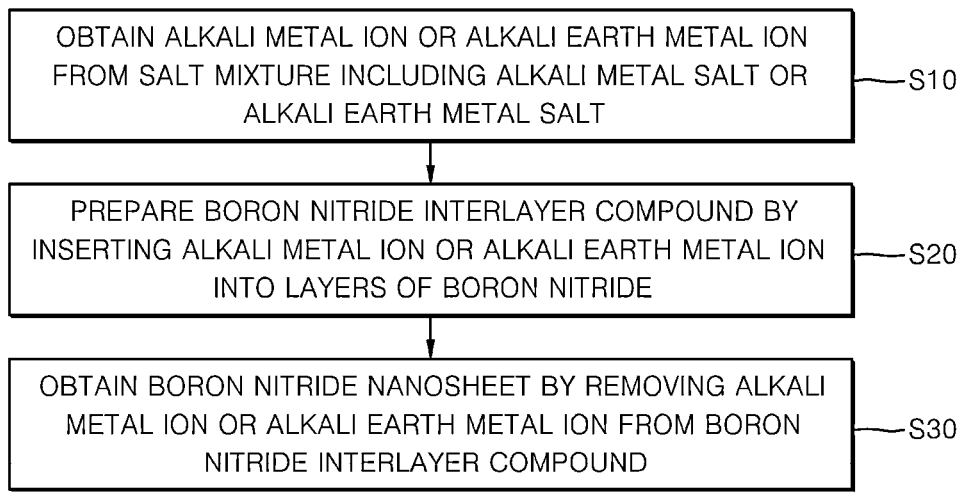
FIG. 1 is a flowchart of a method of manufacturing a hexagonal boron nitride nanosheet according to the present invention.

In the method of manufacturing a hexagonal boron nitride nanosheet according to the present invention, the (a) and (b)

operations may include (i) preparing a hexagonal boron nitride-salt mixture by mixing the salt mixture and hexagonal boron nitride; (ii) melting the salt mixture by heating the hexagonal boron nitride-salt mixture at a eutectic point of the salt mixture or more; and (iii) preparing a hexagonal boron nitride interlayer compound by inserting an alkali metal ion or alkali earth metal ion generated by melting the salt mixture between layers of hexagonal boron nitride to increase a gap between the layers of hexagonal boron nitride and separate the layers of hexagonal boron nitride.

The alkali metal salt or alkali earth metal salt may be metal halide. In addition, to have the eutectic point of 500° C. or less, the salt mixture may be prepared.

The salt constituting the salt mixture is mixed in a eutectic mole fraction.

The operations (ii) and (iii) may be performed in an airtight container.

In the hexagonal boron nitride-salt mixture, at least one of tetrahydrofuran (THF), ammonia, toluene, benzene, dimethyl sulfoxide (DMSO) and dimethylformamide (DMF) may be further added.

Hereinafter, a method of manufacturing a high-quality hexagonal boron nitride nanosheet using a multiple component low temperature eutectic point system according to the present invention will be described in detail with reference to the accompanying drawings. However, examples of the present invention may be modified in various forms, and it will not be construed that the scope of the present invention is limited to examples to be described below. Examples of the present invention are provided to explain the present invention more completely to those of ordinary skill in the art. Therefore, shapes of factors in the drawings are exaggerated to emphasize clearer descriptions.

Figure 2:
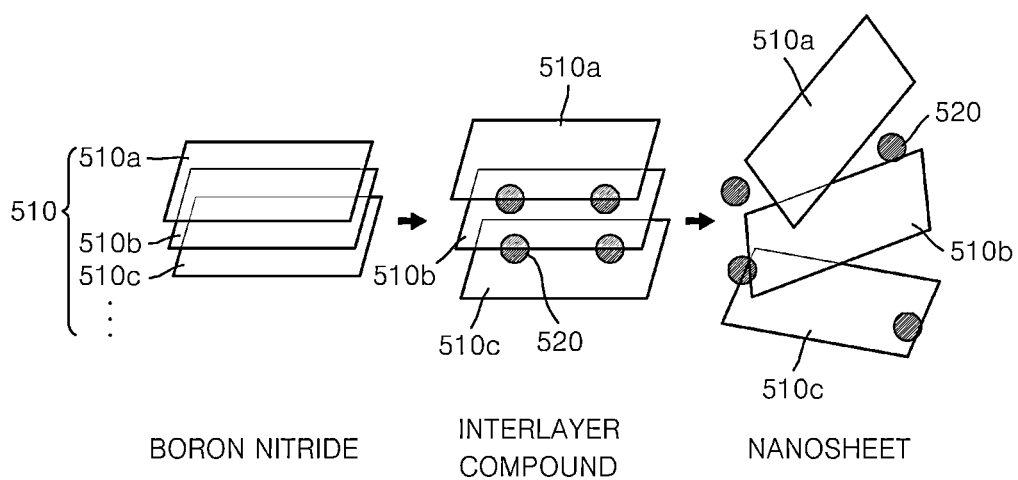
FIG. 2 a schematic diagram showing a process of forming a boron nitride nanosheet using a boron nitride interlayer compound.

FIG. 1 is a flowchart of a method of manufacturing a hexagonal boron nitride nanosheet according to the present invention, and FIG. 2 is a schematic diagram showing the method by processes.

Referring to FIG. 1, in the method of manufacturing a hexagonal boron nitride nanosheet according to the present invention, first, an alkali metal ion or alkali earth metal ion is obtained from a salt mixture including an alkali metal salt or alkali earth metal salt (S10).

A salt mixture is prepared by mixing at least two kinds of salts. At least one of the at least two kinds of salts is an alkali metal salt or alkali earth metal salt. The kind of the alkali metal salt or alkali earth metal salt is not limited, but is preferably one that is inexpensive, safe, and easy to handle. Particularly, a preferable salt is metal halide.

A method of obtaining an alkali metal or alkali earth metal ion from an alkali earth metal salt having an alkali metal ($Li^+$, $Na^+$, $K^+$, $Rb^+$, $Cs^+$) as a cation or an alkali earth metal ion ($Be^{2+}$, $Mg^{2+}$, $Ca^{2+}$, $Sr^{2+}$, $Ba^{2+}$) as a cation, is heating an alkali metal salt or alkali earth metal salt together at a melting point or more. Here, when at least two salts are added, a melting point is decreased in a specific mole fraction of the mixture of at least two salts. The mole fraction at this time is called a eutectic mole fraction, and a melting point when the metal salt has the eutectic mole fraction is called a eutectic point. It can be known through a phase diagram of at least two salts, and eutectic points of some salts are shown in Tables 1 and 2. Table 1 shows eutectic points of a two component system, and Table 2 shows eutectic points of a three component system.

TABLE 1

| | Salt 1 | Salt 2 | Eutectic point |
|---|---|---|---|
| Mol % | KBr (734° C.) 59.5 | KF (857° C.) 40.5 | 581° C. |
| Mol % | KBr (734° C.) 40 | LiBr (550° C.) 60 | 329° C. |
| Mol % | KCl (771° C.) 55 | KF (857° C.) 45 | 606° C. |
| Mol % | KCl (771° C.) 40.8 | LiCl (610° C.) 59.2 | 353° C. |
| Mol % | KF (857° C.) 32.8 | KI (681° C.) 67.2 | 543° C. |
| Mol % | KI (681° C.) 36.6 | LiI (469° C.) 63.4 | 286° C. |

TABLE 2

| | Salt 1 | Salt 2 | Salt 2 | Eutectic point | Reference |
|---|---|---|---|---|---|
| Mol % | LiF (845° C.) 46.5 | NaF (993° C.) 11.5 | KF (858° C.) 42 | 600° C. | Electrochimica Acta 37 (1992) 2433 |
| Mol % | CsCl (645° C.) 0.46 | KCl (771° C.) 0.3 | NaCl (801° C.) 0.25 | 600° C. | Electrochimica Acta 38 (1993) 1481 |
| Mol % | LiCl (605° C.) 52.3 50.5 | KCl (771° C.) 11.6 44.2 | $CaCl_2$ (772° C.) 36.1 5.3 | 600° C. 332° C. | Electrochimica Acta 51 (2005) 561 |
| Mol % | NaCl (801° C.) 33.3 | KCl (771° C.) 33.3 | $CuCl_3$ (734° C.) 33.3 | <600° C. | |
| Mol % | NaCl (801° C.) 20 | KCl (771° C.) 20 | $FeCl_3$ (734° C.) 60 | 279° C. | |

Referring to Tables 1 and 2, it can be known that, though a salt has a high melting point, it may be melted at 600° C. or less to obtain ions. Using this result, a hexagonal boron nitride nanosheet may be manufactured at a low temperature.

In the present invention, at least two metal salts are preferably used. Here, like KI and KCl, the salts may have the same cations and different anions, or like KI and LiI, the salts may have different cations and the same anions. Moreover, like KI and LiCl, anions and cations may all be different. That is, any kind of salt including an alkali metal or alkali earth metal in a cation may be used.

Figure 3A:
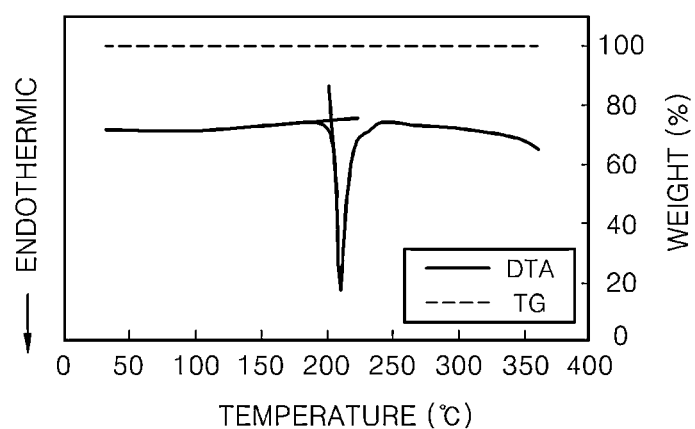
FIG. 3A through FIG. 3C show TG-DTA curves obtained by measuring a melting point of a multiple component system including NaCl, KCl, and $ZnCl_2$.
Figure 3B:
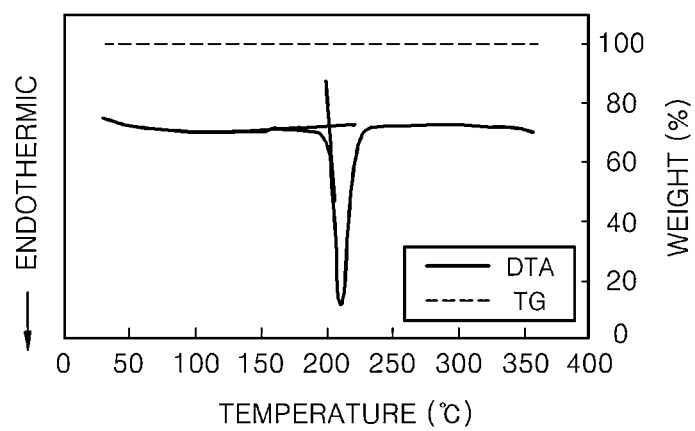
Figure 3C:
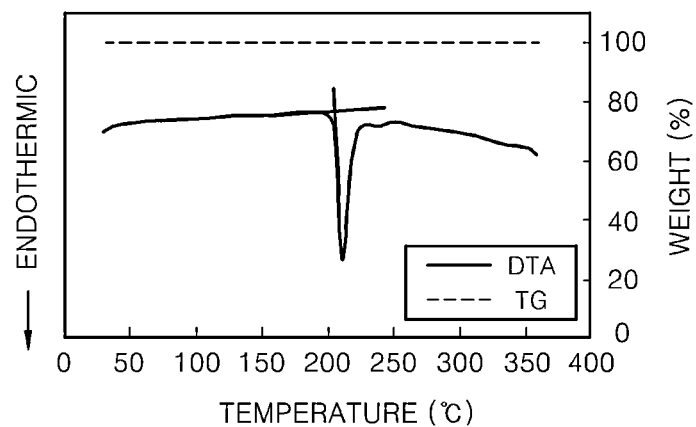

FIG. 3A through FIG. 3C show TG-DTA curves obtained by measuring a melting point of a multiple component system including NaCl, KCl, and $ZnCl_2$. FIG. 3A shows a TG-DTA curve when the salt mixture is prepared in a ratio of NaCl:KCl:$ZnCl_2$=0.225:0.225:0.550, FIG. 3B shows a TG-DTA curve when the salt mixture is prepared in a ratio of NaCl:KCl:$ZnCl_2$=0.200:0.200:0.600, and FIG. 3C shows a TG-DTA curve when the salt mixture is prepared in a ratio of NaCl:KCl:$ZnCl_2$=0.175:0.175:0.650.

As a result of the TG-DTA analysis shown in FIG. 3A through FIG. 3C, a melting point of the salt mixture composed of NaCl, KCl, and $ZnCl_2$ can be known. That is, it is known from curves of the DTA graph that the salt mixtures composed of NaCl, KCl, and $ZnCl_2$ are melted at a temperature of approximately 200° C. The melting points of NaCl, KCl, and $ZnCl_2$ are 801, 771, and 292° C., respectively, but the eutectic point of the salt mixture composed of NaCl, KCl, and $ZnCl_2$ is decreased to approximately 203° C.

Figure 4:
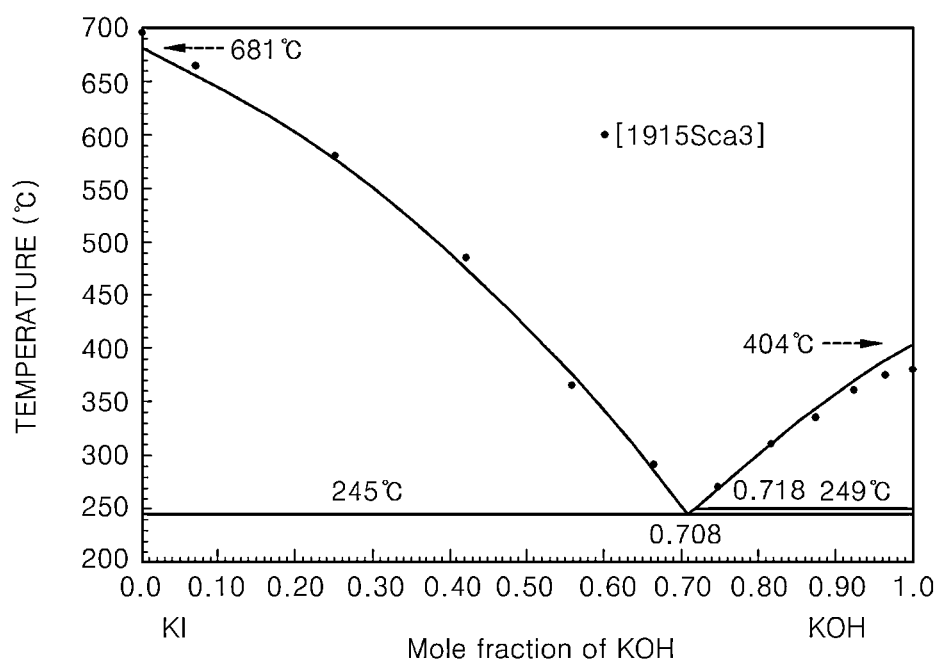
FIG. 4 is a phase diagram of a multiple component system including KI and KOH.

FIG. 4 is a phase diagram of a salt mixture in which KI and KOH are mixed in a mole fraction of 0.3:0.7.

As shown in FIG. 4, it can be known that the salt mixture in which KI and KOH are mixed in a mole fraction of 0.3:0.7 is melted at a temperature of approximately 245° C. That is, KI having a melting point of 681° C. and KOH having a melting point of 404° C. constitute a multiple component system having a eutectic point of 245° C.

Accordingly, when the salt mixture composed of NaCl, KCl, and $ZnCl_2$ or the salt mixture composed of KI and KOH is used, NaCl and KCl, and KI and KOH are melted at a very low temperature, and thus alkali metal ions such as $Na^+$ and $K^+$ may be obtained. Therefore, a hexagonal boron nitride nanosheet is possibly manufactured at a very low temperature using the above-mentioned salt mixture.

Afterward, a boron nitride interlayer compound is prepared by inserting the alkali metal ion or alkali earth metal ion obtained in S10 of FIG. 1 between layers of hexagonal boron nitride (S20). The alkali metal ion or alkali earth metal ion obtained in S10 is spontaneously inserted between the layers of hexagonal boron nitride to widen a gap between the layers of hexagonal boron nitride, resulting in preparation of a boron nitride interlayer compound. Here, when at least one of tetrahydrofuran (THF), ammonia, toluene, benzene, dimethyl sulfoxide (DMSO), and dimethylformamide (DMF) is further added, the interlayer gap is further increased. After the boron nitride interlayer compound is prepared, an operation of removing a byproduct may be further performed.

Then, a hexagonal boron nitride nanosheet is obtained by removing the alkali metal ion or alkali earth metal ion from the boron nitride interlayer compound formed in S20 (S30). Here, when an alcohol having a hydroxyl (—OH) group or a suitable solvent is applied to the boron nitride interlayer compound, the alkali metal ion or alkali earth metal ion may be removed, and thus a single- or multi-layered hexagonal boron nitride nanosheet may be obtained.

Referring to FIG. 2 which is a process schematic diagram, first, as shown in FIG. 2, hexagonal boron nitride powder 510 that becomes an ingredient of the hexagonal boron nitride nanosheet is composed of several layers 510*a*, 510*b*, 510*c*, etc. When the alkali metal ion or alkali earth metal ion 520 obtained in S10 is inserted into the hexagonal boron nitride layers 510*a*, 510*b*, 510*c*, etc. according to S20, as shown in FIG. 2, a boron nitride interlayer compound may be formed.

Subsequently, the alkali metal ion or alkali earth metal ion 520 inserted into the boron nitride interlayer compound is removed by performing S30. As described above, when an alcohol having a hydroxyl group (—OH) is applied, the alkali metal ion or alkali earth metal ion 520 is removed, and the hexagonal boron nitride 510 is separated into several layers 510*a*, 510*b*, 510*c*, etc. Each of the multi-layered boron nitride layers separated as described above is a hexagonal boron nitride nanosheet.

Hereinafter, a specific Experimental Example will be described.

In Experimental Example, as an ion inserted into layers of boron nitride, an alkali metal, that is, a K ion, was selected, and as an alkali metal salt capable of providing a K ion, a two component system including KI and KOH and a three component system including NaCl, KCl, and $ZnCl_2$ were used.

As described above, when at least two salts were mixed at a specific mole fraction, the melting points were decreased. As shown in FIGS. 3A through 3C and 4, since the salt mixture of KI and KOH was decreased in eutectic point to approximately 250° C. and the salt mixture of $NaCl_2$, KCl, and $ZnCl_2$ was decreased in eutectic point to 203° C., when the two component system of KI and KOH and the three component system of NaCl, KCl, and $ZnCl_2$ were prepared in a eutectic mole fraction and heated to a eutectic point of each system or more, hexagonal boron nitride could be dispersed.

Figure 5A:
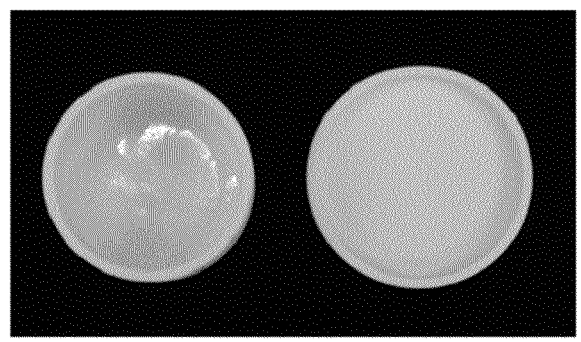
FIG. 5A shows an image when a container is open after KI, KOH, and boron nitride powders are put into a container and heated.

From FIG. 5A, it can be confirmed that hexagonal boron nitride powder was dispersed when the salt mixture of KI and KOH and the mixture of hexagonal boron nitride powder, that is, a hexagonal boron nitride-salt mixture were put into a container and heated to 250° C. When the hexagonal boron nitride-salt mixture was melted by heating at the eutectic point of the salt mixture or more, a boron nitride interlayer compound was prepared by inserting K ions generated in the melted salt mixture into layers of hexagonal boron nitride. An operation of preparing the hexagonal boron nitride interlayer compound by inserting the K ions into the layers of hexagonal boron nitride was as described above.

Figure 5B:
FIG. 5B is an image when the powders obtained after the reaction are dispersed in ethanol.

Afterward, when the hexagonal boron nitride reacted with the salt was put into ethanol as shown in FIG. 5B, the inserted K was released and then a hexagonal boron nitride nanosheet was manufactured.

Figure 6:
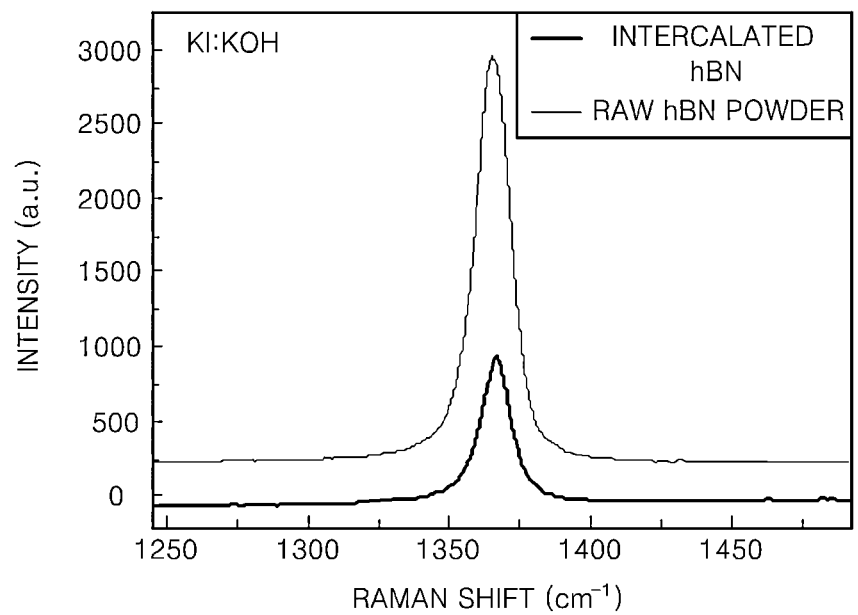
FIG. 6 shows Raman spectroscopy results of a manufactured hexagonal boron nitride nanosheet.
Figure 6:
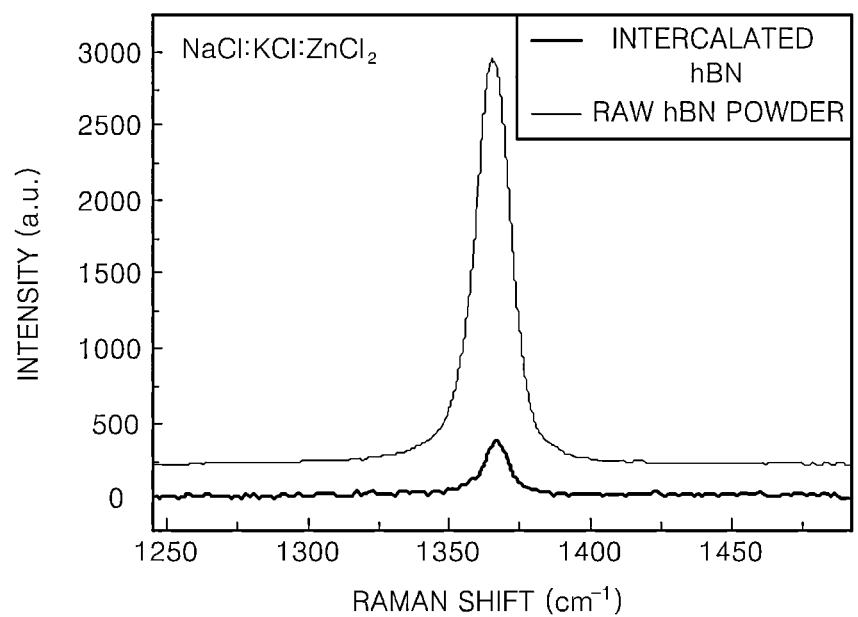

FIG. 6 shows a Raman spectroscopy result with respect to the hexagonal boron nitride nanosheet manufactured by the manufacturing method according to the present invention.

As shown in FIG. 6, as a result of Raman spectroscopy analysis of the hexagonal boron nitride nanosheet manufactured according to the present invention, a peak could be confirmed at a Raman shift of approximately 1365 $cm^{-1}$. The peak shown at a Raman shift of approximately 1365 $cm^{-1}$ was shifted as the number of the layers of hexagonal boron nitride was reduced, and as shown in FIG. 6, it could be observed that the peak shown at a Raman shift of approximately 1365 $cm^{-1}$ was shifted.

Figure 7:
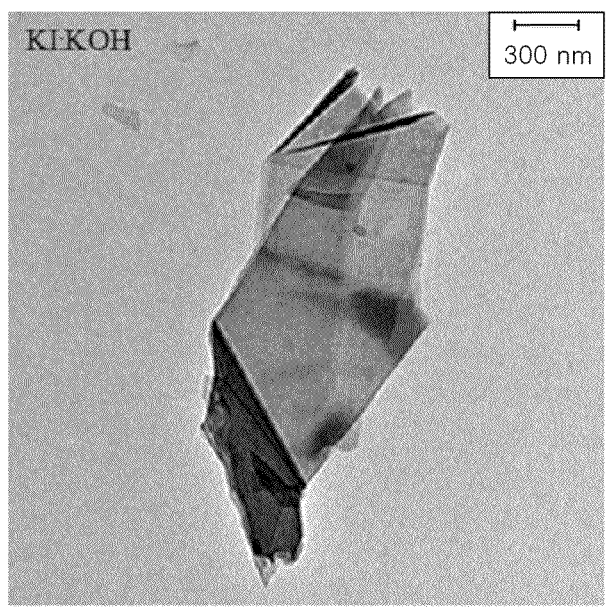
FIG. 7 is a TEM image of the manufactured hexagonal boron nitride nanosheet.
Figure 7:
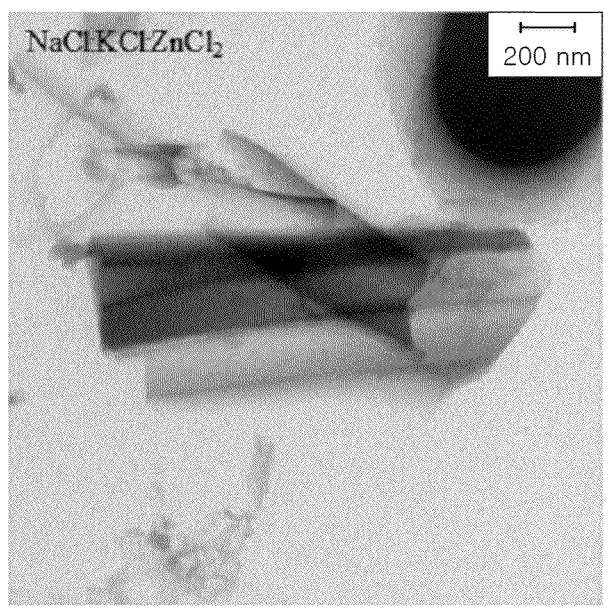
Figure 8:
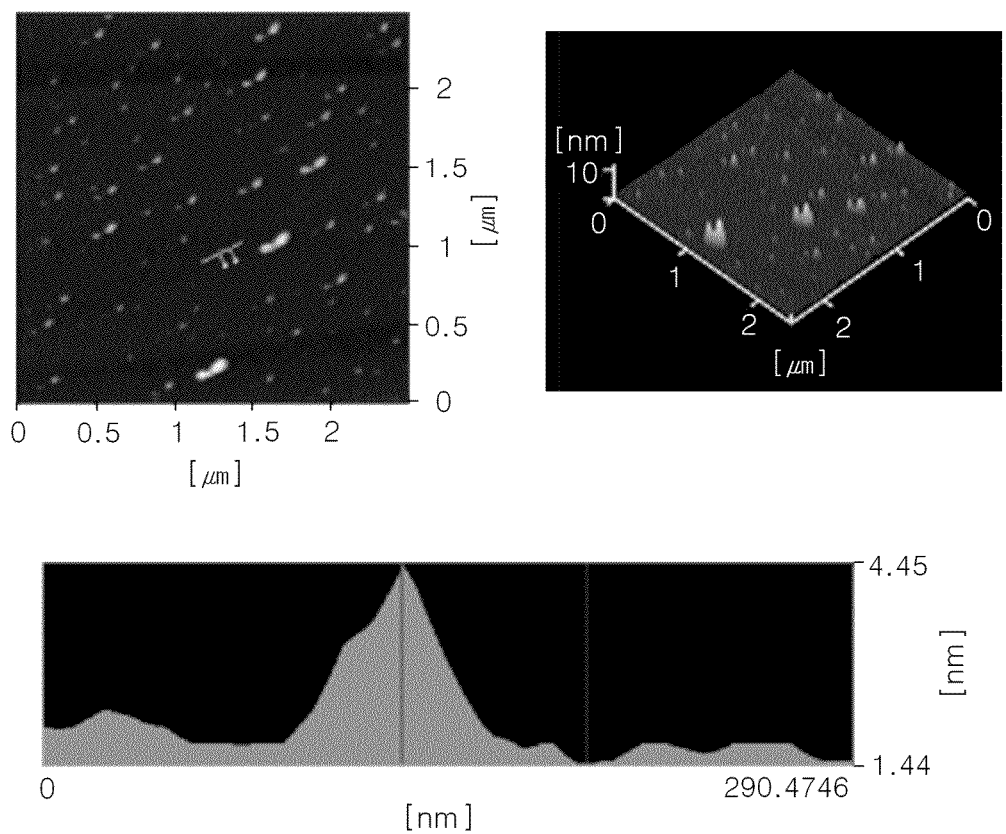
FIG. 8 is an AFM result of the manufactured hexagonal boron nitride nanosheet.

FIG. 7 is a TEM image of a hexagonal boron nitride nanosheet manufactured according to Experimental Example, and FIG. 8 is an AFM image of the hexagonal boron nitride nanosheet manufactured according to Experimental Example. From FIGS. 7 and 8, it can be confirmed that a single- or multi-layered hexagonal boron nitride nanosheet could be manufactured.

Through the Raman spectroscopy, TEM, and AFM analyses, it can be confirmed that a single- or multi-layered hexagonal boron nitride nanosheet was possibly manufactured through dispersion of a K ion-inserted boron nitride interlayer compound by the above-described process method.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method of manufacturing a hexagonal boron nitride nanosheet, comprising:
    (a) obtaining an alkali metal ion or alkaline earth metal ion from a salt mixture including at least two kinds of alkali metal salt or alkaline earth metal salt,
    wherein the salt mixture is melted at a temperature of 245° C. or less;
    (b) preparing a hexagonal boron nitride interlayer compound by inserting the alkali metal ion or alkaline earth metal ion into layers of hexagonal boron nitride; and
    (c) obtaining a hexagonal boron nitride nanosheet by removing the alkali metal ion or alkali earth metal ion from the hexagonal boron nitride interlayer compound.

2. The method according to claim 1, wherein the operations (a) and (b) includes:
    (i) preparing a hexagonal boron nitride-salt mixture by mixing the salt mixture and hexagonal boron nitride;
    (ii) melting the salt mixture by heating the hexagonal boron nitride-salt mixture at a eutectic point of the salt mixture or more; and (iii) preparing a hexagonal boron nitride interlayer compound by inserting an alkali metal ion or alkali alkaline earth metal ion generated by melting the salt mixture between layers of hexagonal boron nitride to increase a gap between the layers of hexagonal boron nitride and separate the layers of hexagonal boron nitride.

3. The method according to claim 2, wherein the alkali metal salt or alkaline earth metal salt is metal halide.

4. The method according to claim 2, wherein the salts constituting the salt mixture are mixed in a eutectic mole fraction.

5. The method according to claim 1, wherein the alkali metal salt or alkaline earth metal salt is metal halide.

6. The method according to claim 1, wherein the salts constituting the salt mixture are mixed in a eutectic mole fraction.

\* \* \* \* \*